United States Patent [19]
Raidl, Jr.

[11] 3,722,734
[45] Mar. 27, 1973

[54] SAFETY RELIEF DEVICE
[76] Inventor: John H. Raidl, Jr., 6625 Millhaven Dr., Mission, Kans.
[22] Filed: Aug. 17, 1970
[21] Appl. No.: 64,182

[52] U.S. Cl. .................................220/89 A, 137/68
[51] Int. Cl. ............................................B65d 25/00
[58] Field of Search.......................137/68; 220/89 A

[56] References Cited

UNITED STATES PATENTS

| | | | |
|---|---|---|---|
| 2,523,068 | 9/1950 | Simpson et al. | 220/89 A |
| 3,072,288 | 1/1963 | Lemmer | 220/89 A |
| 3,091,359 | 5/1963 | Wood | 220/89 A |
| 3,526,336 | 9/1970 | Wood | 220/89 A |
| 3,484,817 | 12/1969 | Wood | 220/89 A |
| 2,875,921 | 3/1959 | Coffman | 220/89 A |
| 2,954,897 | 10/1960 | Hansen et al. | 220/89 A |
| 3,121,509 | 2/1964 | Porter | 220/89 A |
| 3,445,032 | 5/1969 | Raidl, Jr. et al. | 229/89 A |
| 3,294,277 | 12/1966 | Wood | 229/89 A |

Primary Examiner—Joseph R. Leclair
Assistant Examiner—James R. Garrett
Attorney—Irving Powers and Peter S. Gilster

[57] ABSTRACT

A rupture disc and assembly is provided with a reverse acting frangible disc having a relieved burst pattern. The disc is positioned with its convex surface directed upstream and supports a diaphragm seal. When the relief pressure is reached, the disc snaps over center and assumes the configuration of a prebulged frangible disc. A burst pattern is cut or relieved in the dome of the disc to fail at a pressure less than the snap over pressure so that pressure causing snap over results in failure and bursting of the disc. To prevent premature tensile failure, a partial support member is positioned to overlay the relieved pattern. In this manner, a highly precise reverse acting structure is provided without the necessity to include in the assembly a punch such as is normally provided with a reverse acting, frangible disc device.

8 Claims, 11 Drawing Figures

FIGURE 2
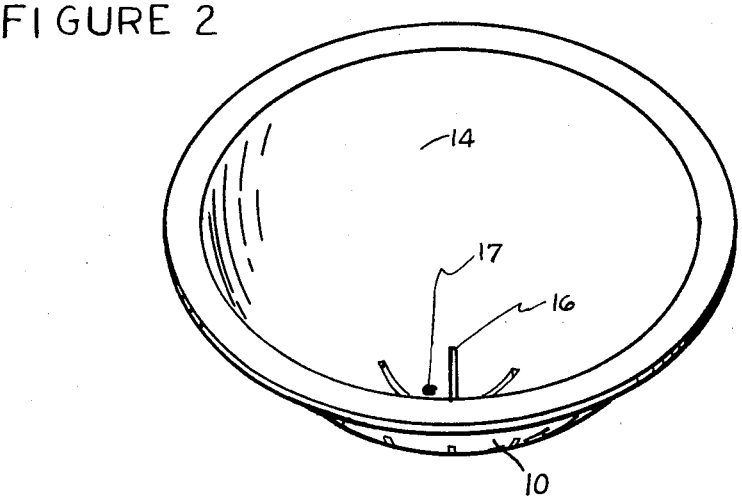
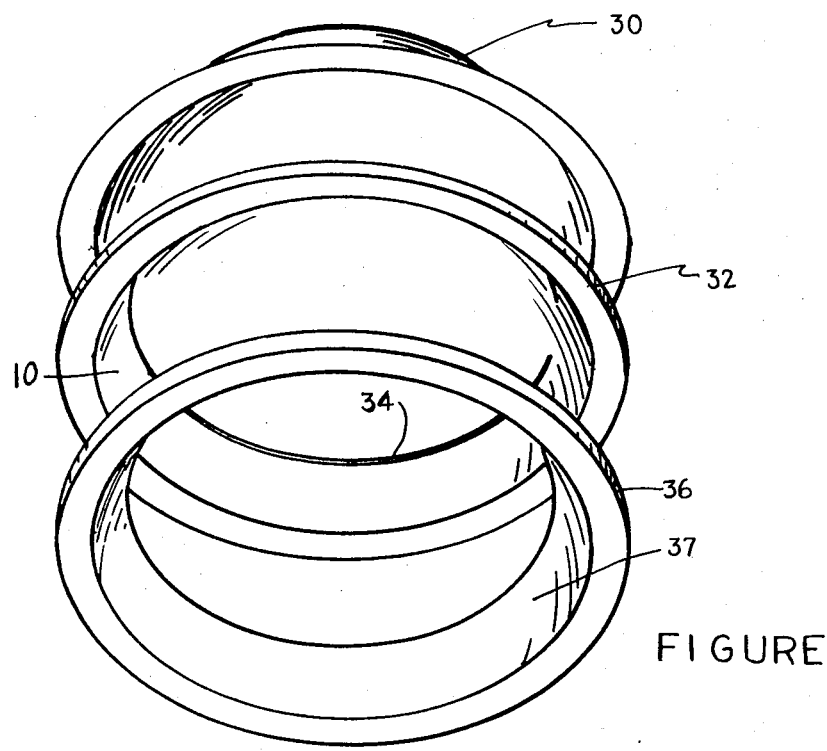
FIGURE 3

INVENTOR.
JOHN H RAIDL, JR.
BY
ATTORNEY

SAFETY RELIEF DEVICE

BACKGROUND OF THE INVENTION

This invention relates to pressure relief devices and, in particular, to such devices employing a frangible sealing member designed to burst when the operating pressure of a system exceeds a preset value.

Frangible member relief devices have, heretofore, employed either of two distinct designs. One design has employed a diagram that is supported on the concave side of a prebulged support member having a relieved or weakened surface in the apex of the bulge. This support member fails by tensile over stress in the weakened area, permitting the pressure to rupture the diaphragm. An alternative design has been the reverse acting disc wherein the convex side of a disc is directed toward the system pressure. When the system pressure exceeds that necessary to covercome the elastic resiliency of this disc, it causes the disc to snap over center and assume a concave configuration. Since the snap over pressure is only from one-third to about one-fifth that necessary to cause tensile failure of the member after it has snapped over center into the concave position, a punch or other means to pierce the disc is mounted downstream from the disc so that when the disc snaps over center it is impaled by the punch.

Each of the aforementioned designs has inherent disadvantages. The prebulged disc design does not have a high precision of preset relief pressure and, as a consequence, the preset relief pressure must be considerably above the normal or operating pressure of the system. The reverse acting design, although more precise in operation, must be used with a disc punch which requires special mounting flanges to insure precise orientation to the snap over member thereby encumbering the installation. The punch also needs periodic maintenance to insure that its blades have not been dulled by previous failures or corrosion.

SUMMARY OF THE INVENTION

It is an object of this invention to provide a reverse acting frangible member device having no encumbering punch means.

It is also an object of this invention to provide said device with a highly precise relief pressure setting.

It is a further object of this invention to provide said device with the capability to permit use of operating pressures within about ninety percent of the preset relief pressure.

Other and related objects will be apparent from the following disclosure.

The aforementioned objects are achieved by the assembly of this invention wherein a frangible diaphragm is supported by a reverse acting support member having a burst pattern cut through the member and a partial support member that reinforces the pattern area and prevents its cavitation, i.e., its premature collapse. The pattern of weakening in the support member is such that the assembly snaps over center to a concave configuration and fails in this configuration at a pressure no greater than the snap over pressure

DESCRIPTION OF THE DRAWINGS

The invention will now be described by reference to the FIGURES, of which:

FIG. 2 shows the underside of a support member;
FIG. 3 shows an alternative embodiment.

DESCRIPTION OF THE PREFERRED EMBODIMENT

Figure 1:
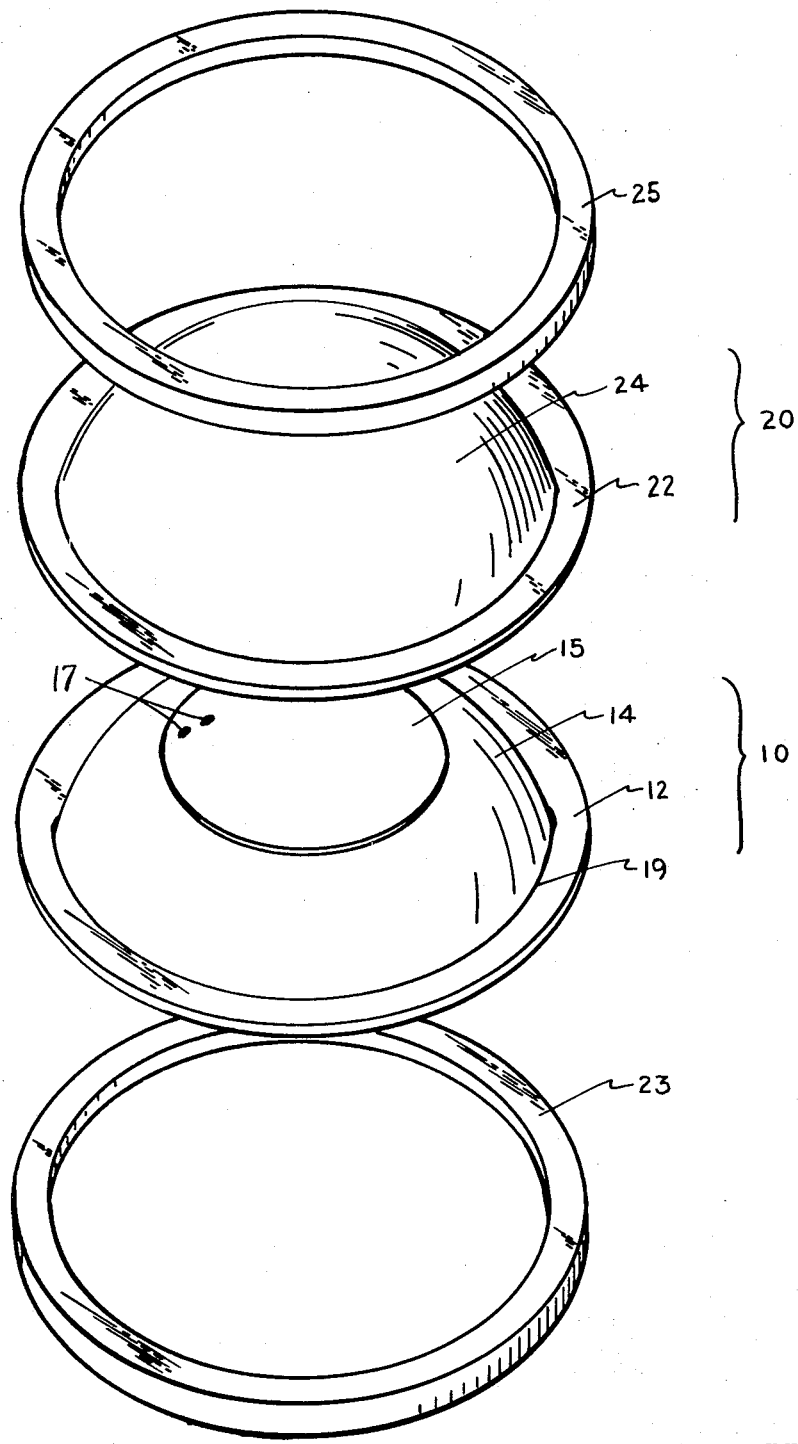
FIG. 1 shows the component parts of an assembly.

Referring now to FIG. 1, there is shown the support, reverse acting member 10 with an annular sealing member 12 and a generally hemispherical shaped dome 14. The exact shape of the dome is not critical to the invention and can be elliptical or conical in cross section; however, the hemispherical shape is preferred for ease of fabrication. Similarly, the sealing flange 12 can be generally flat and in a plane intersecting the base of the dome in a circular transition 19. This is suitable for seating between the opposing faces of flat faced pressure flanges. Alternatively, the assembly can be constructed for fitting between ring joint or tongue and groove flanges, in which case, the sealing flange has a configuration to fit the faces of the particular pressure flanges with dome 14 oriented towards the system pressure.

The support member 10 has a relieved structure in the crown portion of dome 14 which is formed by slits 16 which are scored into or cut through the sheet stock of member 10 with a radial pattern about the dome 14; see FIG. 2. Optionally, a relief pattern can be cut into the base portion of dome 14 rather than the crown portion as described in greater detail hereinafter. To prevent premature failure by localized deformation of dome 14, the relieved portion of the crown is covered with a partial support member which is disc 15 that has a shape to nest against the crown. Disc 15 is secured to the support member 10 by suitable means, e.g., spot welds 17.

The sealing diaphragm member 20 is shown in FIG. 1 and has a matching dome 24 and flange 22 to nest against support member 10 when assembled. The diaphragm 20 and support member 10 together form a reverse acting relief device when oriented with their convex sides exposed to the system pressure. Diaphragm 20 can be a sealing member of a corrosion resistant material such as stainless steel, aluminum, copper, titanium, plastic film, etc., with a thickness from about 0.5 to about 10 mils, preferably from 1 to about 3 mils. The metallic diaphragms contribute resiliency to the assembly and can be used in some applications without use of a vacuum support when the diaphragm is sufficiently strong to resist the maximum expected back pressure during back pressure cycling. The plastic diaphragms are preferably used with a vacuum support as described herein with regard to FIG. 6.

The thickness of support member 10 and the degree of relieving cut into the burst pattern are selected so that the combined pressures necessary to cause snap over of member 10 and diaphragm 20, when a resilient diaphragm is used, will exceed the combined burst pressures to cause rupture (tensile overstress) of the combined diaphragm and member 10 after they snap over to the concave orientation. The degree of relieving can be controlled by the variation in the length and width of slits 16 so that member 10 offers substantially little or no support when in the concave orientation.

In the preferred embodiment, the sealing member 20 and relieved support member 10 are assembled with mounting rings 23 and 25 secured to their flat flange portions, e.g., by spot welds along the periphery of the rings. The use of the mounting rings 23 and 25 increases the precision in operation of the device since the rings are secured to the support and sealing member assembly under factory conditions where precision in orientation of the rings to these members can be achieved. This significantly increases the precision of the relief pressure since even minor deviations in alignment can raise or lower the snap over pressure of the assembly.

FIG. 3 illustrates an alternative frangible disc and support assembly. This comprises the sealing diaphragm member 30 which is similar in size and shape to member 20, previously described. The support member 32 has a similar shape to that described for member 10 of FIG. 1, however, the relief pattern comprises circular slit 34 which extends a substantial distance around the base portion of the dome, as shown. A second support member 36 is provided on the downstream side of member 32 to overlay the relieved portion and thus prevent it from premature failure. Member 36 has a truncated dome portion 37 which nests within member 32 and extends along the base of the dome of member 32 sufficiently to overlap the slit 34 cut into member 32. The assembly of members 32 and 34 are covered, on the upstream side of 34 with diaphragm 30. Preferably the assembly is secured between mounting rings such as 23 and 25 shown in FIG. 1.

Figure 4:
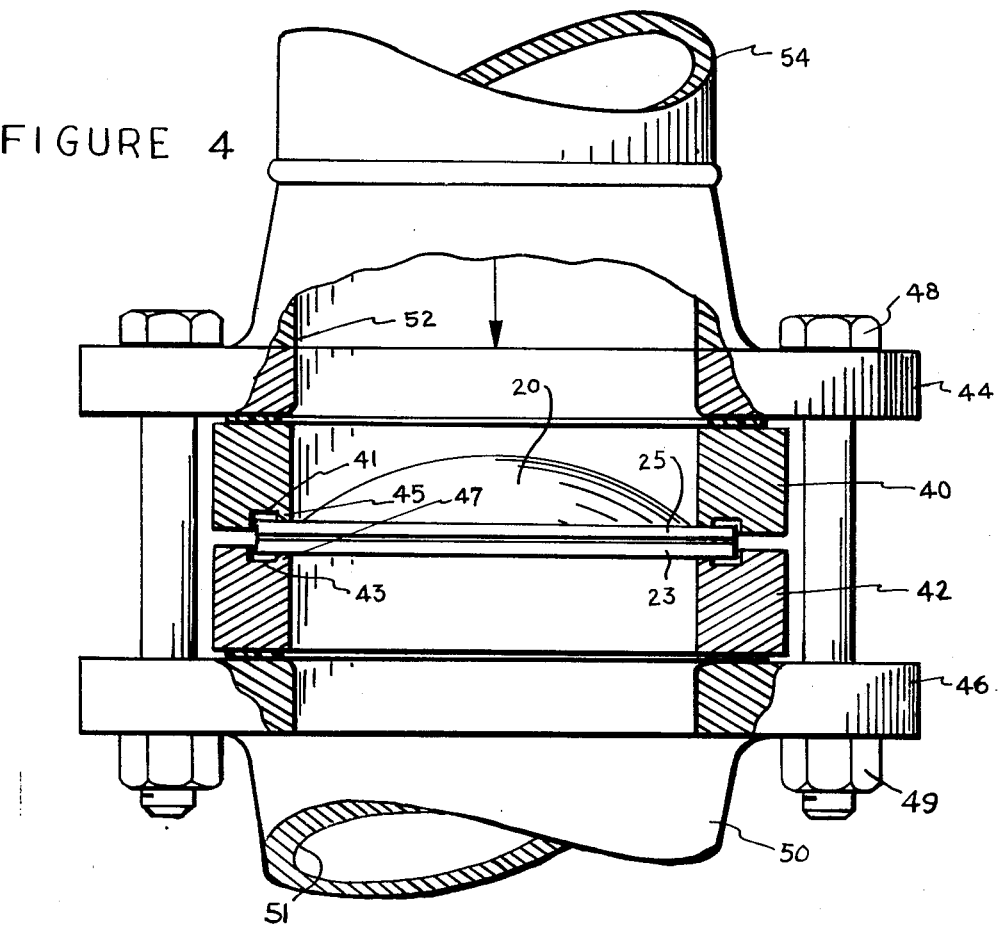
FIG. 4 shows the assembly in mounting flanges.

FIG. 4 illustrates the assembled pressure relief device. The assembly of mounting rings 23 and 25, support member 10 and diaphragm 20 is positioned between mounting rings 40 and 42 which are retained between standard pipe flanges 44 and 46 that have flat sealing faces which are compressed against rings 40 and 42 by assembly bolts 48 and nuts 49. The pipe flanges can be attached to body members or pipe sections such as 50 and 54 having central bores or passages 51 and 52. Section 54 and its passage 52 are on the upstream side of the assembly; section 50 and its passage 51 are on the downstream side (note the arrow in FIG. 4 indicating this). The system pressure is exerted against the convex side of the assembly, against the diaphragm 20, as indicated by said arrow.

The mounting rings 40 and 42 are preferably provided with circular grooves 41 and 43 which are approximately the same diameter as the outside diameter of rings 23 and 25 to center the disc assembly accurately between the rings 40 and 42. Preferably, inner, annular shoulders 45 and 47 are provided about the inner periphery of grooves 41 and 43 to provide a seating surface which engages against the rings 23 and 25. This permits tight sealing of the disc assembly between the mounting rings.

The diaphragm 20 and support member 10 together form a reverse acting relief device that is characterized by initial failure in elastic instability along its circular transition The auxiliary dome 15 or support ring 36 insure that the assembly does not fail by tensile overstress in the relieved area when the dome is oriented with its convex side facing the system pressure. When the pressure exerted by the system exceeds the resiliency of the assembly about the circular transition, the assembly buckles or snaps over center to assume a concave configuration.

With the reverse acting sealing members heretofore employed in pressure relief devices, the members possessed a high tensile strength and resisted rupture in the concave configuration at pressures from 3 to about 20 times the pressure necessary to buckle or snap over the members into the concave configuration. For this reason, such members have commonly been used in combination with a punch means located downstream of the member to impale the member when it snaps over center.

The assembly of this invention, however, employs a support member such as 10 or 32 which is weakened in its tensile resiliency by a relieved pattern such as slits 16 or 34 which are cut through the sheet metal stock of the support member 10 or 32. This pattern is designed and so related to the thickness of the diaphragm and support member that when the assembly is convexly oriented to the system pressure, the assembly initially snaps over center. When the assembly has snapped over center, however, it immediately bursts, since the sum of the tensile strength of the weakened support member plus the tensile strength of the diaphragm is less than the resiliency of the assembly in the convex position. Accordingly, any pressure sufficient to cause the snap over of the assembly from its convex orientation is also adequate to cause rupturing of the assembly when it is concavely oriented to the system pressure.

Figure 5:
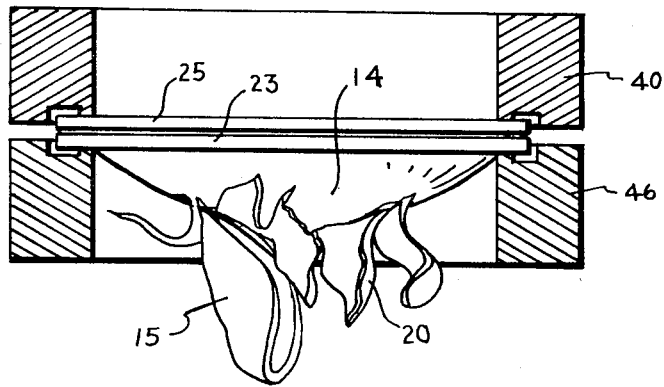
FIG. 5 shows the assembly after failure.

FIG. 5 illustrates the mounting flange and disc assembly after rupture. The disc assembly is reversed in orientation to the system pressure from the position shown in FIG. 4. The dome portion of the support member 10 is torn open and portions of the sealing diaphragm 20 extend through the rupture. The partial support member 15 is shown as still attached to dome 14, accordingly, no portion of the device has been forced downstream, but instead, the entire assembly remains together after rupture.

Relief devices such as described herein are often desired for use in pressure systems that encounter cycling through positive differentials of back pressure, i.e., wherein the pressure upstream of the device falls below the downstream pressure. When the downstream pressure is atmospheric, such a condition occurs whenever a partial vacuum occurs in the system. Since the support member is cut with a relief pattern, it does not seal against the downstream pressure with the result that the back pressure is applied against the frangible diaphragm. When frangible diaphragms are used which have inadequate resiliency to resist the maximum differential back pressure expected, a vacuum support can be included to bear against the upstream surface of the frangible diaphragm and support it during the back pressure cycling. Since the devices commonly exhaust to atmospheric pressure, the maximum differential back pressure expected is generally no greater than about 14 psi.

Figure 6:
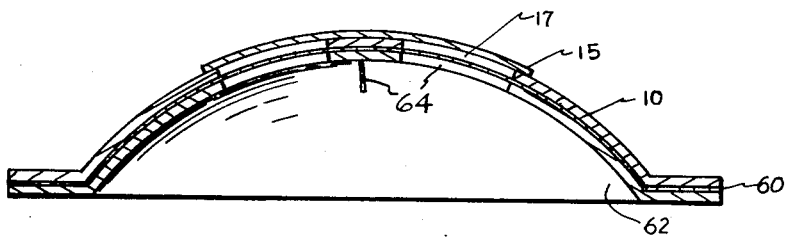
FIG. 6 shows an assembly for systems having pressure cycling.
Figure 10:
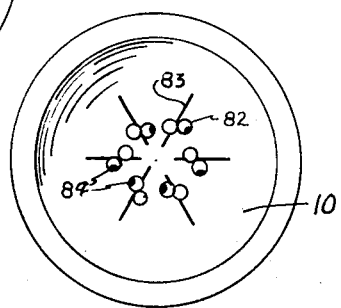

FIG. 6 is a sectional view of an assembly which includes a vacuum support. This assembly includes the partial support member 15, the system pressure support member 10 which has a precut burst pattern of slits 17, all as described in FIG. 1, but which functions as a vacuum support, and a frangible diaphragm 60. This diaphragm can be a resilient metal disc or can be a sheet of plastic with substantially no rigidity or resiliency to positive back pressures. Disposed immediately downstream of diaphragm 60 and nesting in a snug fit in the assembly is the pressure support 62. This support also has a burst pattern that is precut through its thickness in the form of slits 64 which provide a suitable burst pattern to the pressure support when the assembly snaps over center under excessive system pressure. Any of the patterns described herein can be used for this purpose. It is preferred, although not essential, that partial support members 15 be provided to reinforce the vacuum support and prevent its premature collapse or cavitation. These partial support members can be conventional vacuum support members such as are shown in FIG. 10.

In the design of the assembly shown in FIG. 6, the combined resistances to snap over of the pressure support 62, the frangible diaphragm 60 and the support member 10 should be less than their combined resistances to rupture after snap over. This can be accomplished by use of any of the burst patterns described herein. When a plastic film is used as the frangible diaphragm, it of course contributes little or no resistance to snap over in the assembly so that the combined resistance to snap over is the sum of the resistance to snap over of the pressure support 62 and vacuum support member 10.

Figure 7:
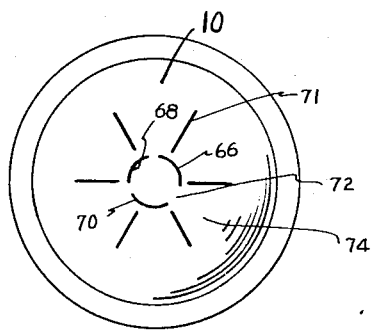
FIGS. 7–9 show alternative burst patterns.

FIG. 7 illustrates an alternative burst pattern that can be cut into the support members. In FIG. 7. the central portion or apex of the support member is relieved by several arcuate slits 66, 68 and 70 with ribs between these slits. Radial slits 71 project outwardly from points in proximity to the arcuate slits. One rib, 72, can be sized wider than the remainder to insure that upon failure of the member this rib will remain intact to secure the apex of the member to sector leaf 74. The radial slits terminate close to the arcuate slits so that the member will tear inwardly into the arcuate slits upon failure rather than tearing transversely from one radial slit to the adjacent radial slit.

Figure 8:
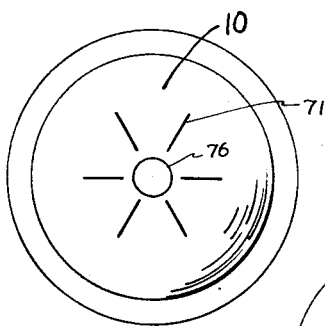

FIG. 8 illustrates an alternative pattern which has a central aperture 76 in the apex with the radial slits 71 terminating in proximity to this aperture. The strength of the support members of FIGS. 7 and 8 can be controlled by variation in spacing between the inner ends of slits 71 and the arcuate slits or the central aperture.

Figure 9:
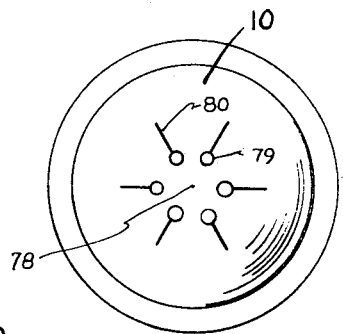

FIG. 9 illustrates a support member with a solid central apex 78 encircled by a plurality of apertures 79 from each of which projects a radial slit 80. These apertures are spaced close to each other about the center so that upon failure the members tear transversely about the apex, from one aperture into the adjacent aperture.

Various partial support members can be used which overlay all or only a portion of the precut pattern in the support members. FIGS. 1 and 3 illustrate partial support members that overlay the entire precut burst pattern. FIG. 10 illustrates the underside of a support member which has partial support members that overlay only a portion of the pattern. These are shown as pairs of circular buttons 82 which are secured to each other to define a tab that overlays the slit 83. One or both of the buttons can be secured to the support member as shown by spot welds 84. Each slit can be supported by one or by a plurality of these buttons.

Figure 11:
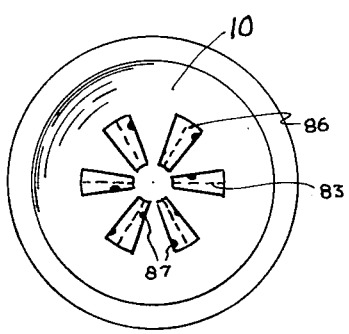
FIGS. 10 and 11 show alternative partial support members.

FIG. 11 illustrates an alternative configuration of the partial support members. These are shown as leaves 86 which overlay slits 83. To secure the leaves in position, one or more spot welds 87 are provided on each leaf to secure it to the support member.

As used herein, the term "slit" has been used to define the cuts into the support members. Slits, wherein no metal is removed by the cutting operation are preferred, however, slots can also be used, if desired, by the actual removal of metal from along the cut. Alternatively, a plurality of discontinuous, but closely spaced slits, slots or apertures can be used, provided that these are so arranged as to form predetermined lines of structural weakness that are cut through the support members. The advantages of the use of cuts entirely through the thickness of the members is that the strength of the members can be accurately and precisely controlled in a predicable fashion simply by controlling the spacing between the cuts and by selection of the pattern of cutting.

The invention has been described by reference to the illustrated, preferred modes of practice. It is apparent that other constructions can be used that will provide substantially the same function and result as those illustrated. It is therefore intended that the invention be defined by the elements and their obvious equivalents set forth in the following claims.

What is claimed is:

1. A reverse acting safety pressure relief device comprising first and second body members each having a passage therethrough with the passage in one of said body members constituting an upstream passage and with the passage in the other body member constituting a downstream passage for the device; means retaining said first and second body members in sealed relationship with said passages in communication with one another; and reverse acting sealing means disposed across said passage at the junction of said first and second body members comprising a sealing diaphragm and support member therefor having arcuate diametrical cross sections in convex orientation relative to said upstream passage, said diaphragm and said support member being reversible from said convex orientation to concave orientation relative to said upstream passage in response to being subjected to a predetermined positive snap-over pressure in said upstream passage, said diaphragm being disposed on the initially convex upstream face of the support member and the initially convex face of said diaphragm being subjected to said pressure in the upstream passage, said support member having a dome portion cut through its thickness to define a predetermined pattern of structural weakness sufficient to cause said support member to rupture when said support member reverses at a pressure no greater than the snap-over pressure whereupon said diaphragm is caused to rupture thereby to effect failure of the sealing means; and partial support means contiguous to said support member and overlapping at least a portion of said pattern of predetermined structural weakness to prevent localized deformation of the structurally weakened support member when it is in the original convex orientation.

2. The device of claim 1 wherein said pattern of predetermined structural weakness comprises an arcuate slit cut along the base portion of the dome of said support member.

3. The device of claim 1 wherein said diaphragm and support member have an annular flat flange surrounding their dome portions with said flat flanges positioned between first and second mounting rings.

4. The device of claim 1 wherein said pattern of predetermined structural weakness comprises radial slits cut through the crown portion of the dome of said support member.

5. The device of claim 4 wherein said partial support means is a disc contoured for securement to the initially convex face of the dome portion of the support member overlying the radial slits in said dome portion.

6. The device of claim 4 wherein said partial support means comprises a plurality of support tabs secured to the initially concave face of the support member with each tab overlapping one of said radial slits.

7. The device of claim 1 wherein said sealing means also comprises a second support member positioned upstream of said diaphragm and having an arcuate cross section with its concave surface supporting said diaphragm and at least one cut through its thickness to define a predetermined pattern of structural weakness.

8. The device of claim 7 wherein said second support member also bears at least one partial support member that overlaps at least a portion of its pattern of predetermined structural weakness.

* * * * *